Feb. 6, 1962 H. R. DAY, JR 3,020,433
STORAGE ELECTRODE STRUCTURE
Filed May 18, 1956

Inventor:
Harold R. Day Jr.,
by Paul L. Franks
His Attorney.

United States Patent Office 3,020,433
Patented Feb. 6, 1962

3,020,433
STORAGE ELECTRODE STRUCTURE
Harold R. Day, Jr., Ballston Lake, N.Y., assignor to General Electric Company, a corporation of New York
Filed May 18, 1956, Ser. No. 585,786
9 Claims. (Cl. 313—68)

My invention relates to an electrode structure for storage tubes and more particularly to a double-sided storage electrode which does not change its characteristics during protracted use, provides improved resolution and is not subject to microphonics.

Storage electrodes have been employed for many years in television camera tubes and various other applications where it is desired to store a charge pattern produced, or written, thereupon for a certain finite time or until the pattern is subsequently scanned, or read, by an electron beam.

A general form for such electrodes has in the past been that of a glass membrane, extremely thin to provide for charge conduction between its surfaces and but minimal conduction parallel thereto. Such membranes are fragile and subject to vibration. Even under static conditions they have a short useful life because the glass tends to polarize and to retain effects of prior charge patterns.

Other structures to replace the thin glass membrane have been suggested which incorporate metal plugs inserted in apertures of an insulation-coated metal mesh. Such structures are unsatisfactory, however, because of the capacitance effects introduced by a metal mesh, difficulties in registration of such a mesh with auxiliary electrodes, and because there has been no practiceable method of forming plugs which are both spaced from the mesh surfaces and permanently fixed in position.

Therefore, it is an object of my invention to provide an improved storage structure for storage tubes which is not subject to deterioration during protracted use and which has maximum conductivity perpendicular to its surfaces and maximum resistance parallel thereto.

It is a further object to provide an improved storage structure which incorporates one or more auxiliary electrodes in optimum registration therewith in a manner to avoid microphonic disturbances.

According to an illustrated embodiment of my invention the charge storage structure comprises a plurality of metallic charge storage plugs fixed within the apertures of a unitary glass mesh. The plugs are indented from the surfaces of the mesh. Auxiliary electrode grids may be formed on the mesh surfaces and isolated from the plugs.

Features of this invention which are believed to be novel are pointed out with particularity in the appended claims. However, for a better understanding of the invention, together with further objects and advantages thereof, reference should be had to the following description taken in conjunction with the accompanying drawing wherein:

Figure 1:
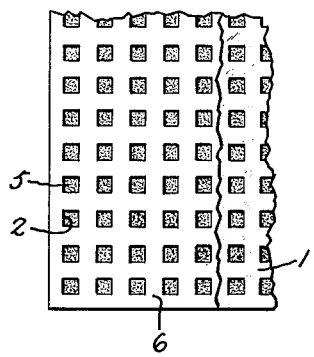
FIGURE 1 illustrates a plan view of a storage electrode structure according to my invention.
Figure 2:
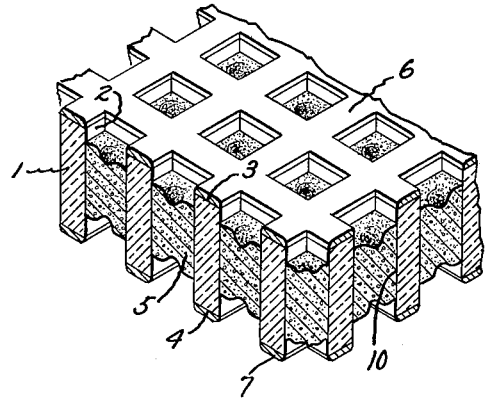
FIGURE 2 is a perspective view of a section of the structure of FIGURE 1.

Reference is made to FIGURES 1 and 2 which illustrate a portion of a storage electrode structure according to my invention. The structure comprises, by way of example, a sheet of ultra-violet-light sensitive glass preferentially etched to define a mesh 1 having a plurality of closely spaced apertures 2 of the order of 10,000 to 250,000 per square inch. Each of the apertures is uniformly tapered and extends from the front surface 3 of the mesh to the rear surface 4. Within each aperture there is formed, as will be more fully explained hereinafter, a metallic charge storage plug 5 which is accessible from the front or rear of the storage structure. The rectilinear apertures illustrated make it possible for an electrode structure to have a greater ratio of aperture area to mesh area without loss of rigidity. Further, the constant, regular spacing of the apertures eliminates spurious signal noises which occur when a random array of storage elements is scanned by an electron beam.

Auxiliary electrodes 6 and 7 may be provided in an integral structure with the array of charge storage plugs to eliminate completely problems of registration and of microphonics due to a relative movement of such electrodes and the storage array. As may be more clearly seen in the perspective view of FIGURE 2, each of the conducting plugs 5 is indented from the surfaces of the glass mesh and is therefore insulated from conducting coatings 6 and 7 as required for specific storage tube applications.

It will be apparent that such an electrode structure may be advantageously incorporated in conventional television camera tubes to replace the thin glass membranes now employed. In such application, an electron image must be produced thereupon from one side of the storage electrode and read from the other side. Also it is necessary that a collecting electrode be included adjacent the storage electrode for the control of secondary electrons. In the past the collecting electrode took the form of a conducting grid spaced from the thin glass membrane and the assembly was, therefore, inherently prone to vibration produced microphonics. It can be readily seen that in the illustrated structure according to my invention there can be no relative motion of the various components.

The storage electrode structure illustrated in detail in FIGURE 2, is accomplished according to the following method, being the method set forth and claimed in my copending divisional application, Serial No. 130,716, filed July 12, 1961, entitled "Method of Making Storage Electrode Structure." After thorough cleaning of the mesh utilizing a chromic acid bath or the like, conducting plugs are formed by filling the mesh apertures with a paste comprising finely divided solid particles of a reducible metallic compound. While the preferred material for the plugs is silver oxide mixed to a paste with a nitrocellulose binder, other compounds such as nickel oxide, silver sulfide and cuprous oxide may be used advantageously and a vehicle such as water may be substituted for the nitrocellulose binder. Satisfactory results may also be obtained by employing finely divided particles of a metal such as silver.

Figure 3:
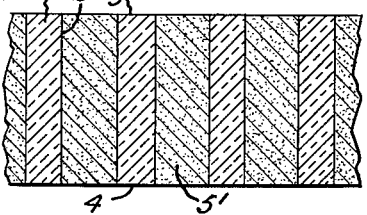
FIGURES 3, 4, 5, 6 and 7 illustrate various stages during the preparation of the storage electrode structure according to my invention.
Figure 4:
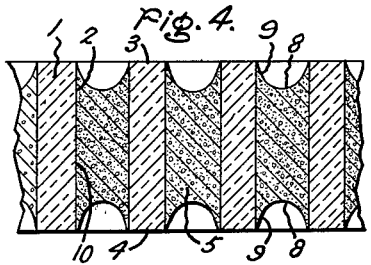

After removal of excess material from the surfaces of the mesh the assembly as illustrated in FIGURE 3 is heated to reduce the solid particles of the mixture filling the apertures to metallic form, to metallic silver in a case of silver oxide. The binder, or vehicle, is dissipated and the metallic remainder is left in a sintered, porous form. The ends 8 of the plugs assume a generally concave form illustrated in FIGURE 4 due to shrinkage. In case of excessive shrinkage more of the filling material is compacted into the apertures and the reducing process is repeated. It can be seen that at this stage attenuated portions of the plugs as at 9 extend to the surfaces 3 and 4 of the mesh and unless removed would short-circuit the plugs to a surface electrode.

In order to provide a positive spacing between the ends of the plugs and the mesh surfaces the plugs are etched in a suitable etching bath. However, if the etching fluid were applied to the assembly without further preparation etching fluid would penetrate the porous structure of the plugs and interstices along the interface 10 between the plug and aperture sidewalls. This would result in the plugs being loosened from the apertures and being liable to removal during normal handling of the structure. To avoid this condition the sintered metal plugs are impregnated with a wax-like material which is not affected by the etching fluid. Beeswax is preferred, however, other waxes and paraffins may be used effectively. The impregnation may be done while the assembly is maintained at an elevated temperature under a vacuum so that the wax is readily absorbed into the pores of the structure.

Figure 5:
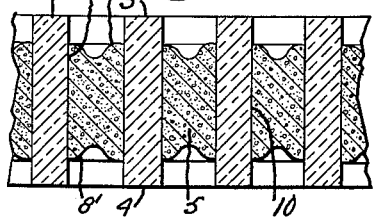

Wax is leached from the surfaces of the plugs by a solvent such as benezene and the assembly is then exposed to an etching fluid. Wax within the body of the plugs acts as an inhibitor to control etching speed and to prevent etching fluid from penetrating and destroying the bond between the plugs and the sidewalls of the apertures. The etching and leaching are continued alternatively until the ends 8' of the plugs are indented from the surfaces of the mesh as shown in FIGURE 5. This assures that the plugs are isolated electrically and mechanically from the surfaces of the mesh. The remainder of the inhibitor is then removed by a suitable solvent. This step, however, may be deferred until later in the process after conductive grids have been applied to the mesh surfaces as explained hereinafter.

Figure 6:
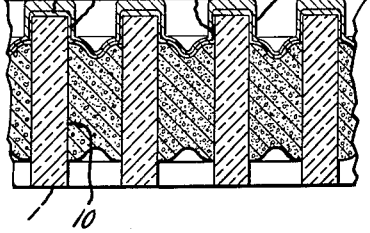

A unique feature of this invention is that both the front and rear surfaces 3 and 4 of the mesh are available for supporting control electrodes in fixed spatial relationship to the array of charged storage plugs. The grids are applied by first evaporating a thin coating of a metal, preferably silver on the mesh. Evaporation is done from a direction perpendicular to the surface of the mesh and at a distance so that metal is applied to the mesh surface as at 11 to a greater thickness than to the exposed sidewalls of the apertures as at 12 in FIGURE 6.

The surface grid is built up to the desired thickness by plating a second coating on the evaporated coating utilizing a conventional plating bath of low throwing power. That is, a plating bath which causes selective deposition on the outermost surfaces of the assembly. This results in a plated coating upon the evaporated coating which is thicker on the mesh surface as at 14 than upon the sidewalls of the apertures as at 15. Plating is continued until a deposit on the mesh is thicker than the desired surface grid by an amount approximately equivalent to the thickness of the coatings upon the sidewalls of the apertures.

Figure 7:
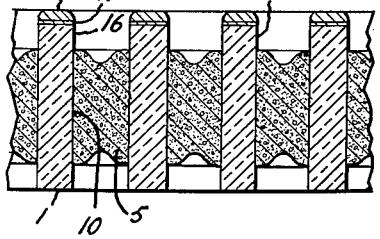

Final form for the storage electrode structure illustrated in FIGURE 7 is achieved by a further etching process in which the exposed metal surfaces are etched an amount to remove the portions 12 and 15 of the metal coatings connecting the plug and the surface grid to expose portions of the aperture sidewalls as at 16 without complete removal of the coatings from the surface of the mesh. Depending upon the application of the electrode structure, surface grids may be applied to one side only of the mesh or to both sides of the mesh. When both front and rear grids are required they may be applied simultaneously or by alternating the various steps of the method as outlined above.

As a specific example, I have made charge storage structures utilizing a glass mesh five mils thick and with 90,000 apertures per square inch, each aperture being two mils square in cross-section. The apertures were filled with a paste of powdered silver oxide, maximum particle size one micron, and a binder of a 60 second viscosity nitrocellulose-amyl acetate lacquer. Reduction to metallic silver was by heating at a temperature from 400 to 450° C. for one hour in air.

The assembly was coated with commercial beeswax and maintained under a vacuum at a temperature above the boiling point of the wax for one minute. Commercial benzene was used to remove wax from the mesh surfaces and to leach wax from the ends of the plugs. The plug ends were etched for five seconds in a 40% nitric acid solution. Leaching and etching were continued alternatively until the plug ends were indented at least one mil from the mesh surfaces. The remainder of the wax was then removed by boiling the assembly in benzene.

The surface electrodes were formed by evaporating a coating of silver approximately 150 angstroms thick on the mesh surfaces and by plating a further layer of silver one to two microns thick. The plating solution comprised silver cyanide 41 g./l., potassium cyanide 40 g./l., potassium hydroxide 11 g./l., and potassium carbonate 62 g./l. in water. Plating was begun in a strike bath for 15 seconds employing the above solution diluted 10 to 1 with water and continued in the full strength bath for 1 minute. The baths were maintained at room temperature and at a current density of approximately 10 amperes per square foot.

Final form was achieved by removing the evaporated and plated coatings from the aperture sidewalls by etching in a saturated solution of potassium cyanide in water for ten seconds.

In the foregoing disclosure, it has been shown that my invention provides an improved charge storage structure which may include auxiliary electrodes in fixed spatial relationship with an array of isolated charged storage plugs to avoid the disadvantages of prior storage structures. It should be understood my invention is not limited to the precise construction herein described in connection with the illustrative drawings but that other embodiments within the scope of the appended claims are to be considered within the purview of my invention.

What I claim as new and desire to secure by Letters Patent of the United States is:

1. A storage electrode for storage tubes comprising an integral, self-supporting, rigid glass structure in the form of a mesh defining a plurality of regularly arranged, rectilinear apertures extending therethrough, a conducting coating on a surface of said mesh, and plugs of conducting material within said apertures, each of said plugs being spaced from said coating.

2. A storage electrode structure for storage tubes comprising an integral, self-supporting, rigid non-metallic structure in the form of a mesh defining a plurality of equally spaced apertures therethrough, said mesh having a thickness no greater than 5 mils, a conducting coating on each surface of said mesh, and plugs of conducting material within said apertures, each said plug being spaced from each said coating.

3. A storage electrode for storage tubes comprising an integral, self-supporting, rigid glass structure in the form of a mesh defining a plurality of rectilinear, regularly arrayed apertures therethrough, a conducting coating on each surface of said mesh, and plugs of conducting material within said apertures, each said plug being spaced from each said coating.

4. A sheet of insulative material having pits on one surface thereof; a perforated conductive film positioned on said surface, said perforations being aligned with said pits, said solid portions of said film being contiguous and in intimate contact with the unpitted portions of said surface, whereby said perforated conductive film is formed into a control grid structure which is immovably attached to a rigid sheet of insulated material, and therefore is unable to flex.

5. A combination comprising a sheet of insulative material having two substantially parallel surfaces, one of said surfaces having raised portions; a rigid inelastic grid positioned on said latter surface, said grid comprising a conductive film positioned in contiguous and intimate contact with said raised portions, whereby all parts of said grid are fixedly positioned with respect to said surface; and an inelastic conductive backing plate on the other surface of said sheet, said plate comprising a conductive material contiguous with said second surface of said sheet; whereby said grid and said backing plate are each fixedly positioned with respect to each other and with respect to said sheet, so that microphonic-type distortions are obviated.

6. The structure of claim 5 wherein said backing plate comprises a film positioned in intimate contact with said second surface.

7. The structure of claim 6 wherein said insulative material is photoform glass.

8. A target for a barrier grid storage tube comprising: a plate of dielectric material having depressions on one surface thereof; a conductive coating of material having a low secondary emissive characteristic positioned in contiguous and intimate contact with the undepressed portions of said surface; means for connecting an electrical circuit to said coating; a conductive film positioned in contiguous and intimate contact with the other surface of said sheet; and means for connecting an electrical circuit to said conductive film.

9. The device of claim 8 wherein said insulative material is photoform glass.

References Cited in the file of this patent

UNITED STATES PATENTS

| | | |
|---|---|---|
| 1,643,526 | Stockinger | Sept. 27, 1927 |
| 2,091,862 | Kessler | Aug. 31, 1937 |
| 2,197,753 | Liebmann | Apr. 23, 1940 |
| 2,403,225 | Law | July 2, 1946 |
| 2,596,617 | Teal | May 13, 1952 |
| 2,730,640 | Koller | Jan. 10, 1956 |
| 2,768,318 | Bradley | Oct. 23, 1956 |
| 2,793,178 | Morris | May 21, 1957 |

FOREIGN PATENTS

| | | |
|---|---|---|
| 688,959 | Great Britain | Mar. 18, 1953 |